(12) United States Patent
Golombowski et al.

(10) Patent No.: US 11,859,109 B2
(45) Date of Patent: Jan. 2, 2024

(54) PRIMERLESS POLYURETHANE ADHESIVE COMPOSITIONS

(71) Applicant: DDP SPECIALTY ELECTRONIC MATERIALS US, LLC, Wilmington, DE (US)

(72) Inventors: Dietmar Golombowski, Horgen (CH); Sergio Grunder, Freienbach (CH)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 624 days.

(21) Appl. No.: 17/055,730

(22) PCT Filed: Jun. 14, 2019

(86) PCT No.: PCT/US2019/037219
§ 371 (c)(1),
(2) Date: Nov. 16, 2020

(87) PCT Pub. No.: WO2020/009792
PCT Pub. Date: Jan. 9, 2020

(65) Prior Publication Data
US 2021/0207012 A1    Jul. 8, 2021

Related U.S. Application Data

(60) Provisional application No. 62/693,006, filed on Jul. 2, 2018.

(51) Int. Cl.
| | | |
|---|---|---|
| *C09J 175/08* | (2006.01) | |
| *C08G 18/79* | (2006.01) | |
| *C08G 18/76* | (2006.01) | |
| *C08G 18/72* | (2006.01) | |
| *C08G 18/48* | (2006.01) | |
| *C08G 18/28* | (2006.01) | |
| *C08G 18/24* | (2006.01) | |
| *C08G 18/20* | (2006.01) | |
| *C08G 18/16* | (2006.01) | |
| *C08G 18/12* | (2006.01) | |
| *C08K 3/26* | (2006.01) | |
| *C08K 3/36* | (2006.01) | |

(52) U.S. Cl.
CPC ............ *C09J 175/08* (2013.01); *C08G 18/12* (2013.01); *C08G 18/165* (2013.01); *C08G 18/2018* (2013.01); *C08G 18/246* (2013.01); *C08G 18/283* (2013.01); *C08G 18/289* (2013.01); *C08G 18/4812* (2013.01); *C08G 18/4829* (2013.01); *C08G 18/725* (2013.01); *C08G 18/7671* (2013.01); *C08G 18/792* (2013.01); *C08K 3/26* (2013.01); *C08K 3/36* (2013.01); *C08K 2003/265* (2013.01)

(58) Field of Classification Search
CPC ........ C09J 175/08; C08G 18/79; C08G 18/76; C08G 18/72; C08G 18/48; C08G 18/28; C08G 18/24; C08G 18/20; C08G 18/16; C08G 18/12
USPC .......................................... 524/188
See application file for complete search history.

(56) References Cited

U.S. PATENT DOCUMENTS

| | | |
|---|---|---|
| 5,773,490 A | 6/1998 | Shikinami et al. |
| 6,657,035 B1 | 12/2003 | Nakata et al. |
| 10,202,527 B2 | 2/2019 | Kulkarni et al. |
| 2006/0270807 A1* | 11/2006 | Zhu ........................ C09J 175/04 525/453 |
| 2008/0149257 A1* | 6/2008 | Tribelhorn ............. C09J 175/08 525/190 |
| 2015/0013904 A1 | 1/2015 | Tribelhorn et al. |
| 2021/0122955 A1 | 4/2021 | Grunder et al. |

FOREIGN PATENT DOCUMENTS

WO    2008076146    6/2008

* cited by examiner

*Primary Examiner* — Deve V Hall

(57) ABSTRACT

Disclosed are polyurethane adhesive compositions which include (a) one or more urethane prepolymers having isocyanate moieties; (b) a catalytic amount of one or more catalysts; (c) one or more fillers; (d) one or more silane adhesion promoters; and (e) one or more monofunctional polyalkylene glycols.

14 Claims, No Drawings

PRIMERLESS POLYURETHANE ADHESIVE COMPOSITIONS

FIELD

The present invention relates to primerless polyurethane adhesive compositions which are capable of being used to bond glass into structures.

BACKGROUND

Polyurethane sealant (adhesive) compositions are used in many industries. For example, in the automotive industry, polyurethane adhesive compositions are used to bond substrates such as glass objects, e.g., a windshield, backlight window and quarter glass, into the car body structure. Polyurethane adhesive compositions typically contain a polyurethane prepolymer together with a silane adhesion promoter. In order to bond the polyurethane adhesive composition to the substrate such as glass, a pre-treatment step must be carried out by applying a primer or activator to the substrate to provide durable long-term adhesion promotion of the adhesive composition. In general, standard surface treatments are represented by a glass primer or wipe treatment, or abrasive treatments that increase chemical surface linkup via reactive chemical groups. As part of the general simplification and process streamlining, many vehicle manufacturers have been trying to eliminate surface pre-treatment steps using a separate prime composition. This way, the adhesive is intended to be directly applied onto glass or paint without a separate prime application step. Key requirements for such simplified applications are adhesion built-up of the adhesive to paint, e-coat and glass in order to form long term durable joints.

It would be desirable to provide a polyurethane adhesive composition which exhibits very good adhesion promotion to a substrate such as a glass surface without any surface pretreatment to endure an entire vehicle life cycle.

SUMMARY

In one illustrative embodiment, a polyurethane adhesive composition is provided which comprises:
 (a) one or more urethane prepolymers having isocyanate moieties;
 (b) a catalytic amount of one or more catalysts;
 (c) one or more fillers;
 (d) one or more silane adhesion promoters; and
 (e) one or more monofunctional polyalkylene glycols.

In one illustrative embodiment, a method for bonding two substrates is provided, which comprises:
 (a) applying a polyurethane adhesive composition to at least a portion of a first substrate, wherein the polyurethane adhesive composition comprises: (i) one or more urethane prepolymers having isocyanate moieties; (ii) a catalytic amount of one or more catalysts; (iii) one or more filler; (iv) one or more silane adhesion promoters; and (v) one or more monofunctional polyalkylene glycols;
 (b) contacting a second substrate with the first substrate; and
 (c) curing the polyurethane adhesive composition to form an adhesive bond between the first substrate and the second substrate.

The polyurethane adhesive composition of the present invention advantageously adheres to a substrate such as glass without the use of pre-treatment step to the substrate by employing one or more monofunctional polyalkylene glycols. Thus, the use of monofunctional polyglycols provides a durable primerless to glass adhesion via in-situ aliphatic endcapping of the polyurethane prepolymer during adhesive processing. This, in turn, will assist in adjusting the chemical compatibility to the bonding substrate as a compatibilizing component, and reduce the moisture uptake that causes cataplasm adhesion performance to deteriorate.

DETAILED DESCRIPTION

Disclosed is a polyurethane adhesive composition which includes (a) one or more urethane prepolymers having isocyanate moieties; (b) a catalytic amount of one or more catalysts; (c) one or more fillers; (d) one or more silane adhesion promoters; and (e) one or more monofunctional polyalkylene glycols. The term "one or more" as used herein shall be understood to mean that at least one, or more than one, of the recited components may be used.

The one or more urethane prepolymers having isocyanate moieties component (a) of the polyurethane adhesive composition according to the present invention includes any conventional prepolymer used in polyurethane adhesive compositions. The urethane prepolymers for use in preparing the composition of the invention include any prepolymer having an average isocyanate functionality of at least 2.0 and a weight average molecular weight of at least 2,000. In one embodiment, the average isocyanate functionality of the prepolymer is at least 2.2, or at least 2.4. In one embodiment, the average isocyanate functionality is no greater than 4.0, or no greater than 3.5 or no greater than 3.0. In one embodiment, the weight average molecular weight of the prepolymer is at least 2,500 or at least 3,000, and no greater than 40,000, or no greater than 20,000, or no greater than 15,000 or no greater than 10,000.

In general, the urethane prepolymer may be prepared by any suitable method, such as reacting one or more isocyanate compounds comprising a polyisocyanate with one or more isocyanate-reactive compounds. In one embodiment, the urethane prepolymer is obtained by reacting an isocyanate-reactive compound containing at least two isocyanate-reactive, active hydrogen containing groups with an excess stoichiometric amount of a polyisocyanate under reaction conditions sufficient to form the corresponding prepolymer. In one embodiment, the polyisocyanates have an average isocyanate functionality of at least 2.0 and an equivalent weight of at least 80. In one embodiment, the isocyanate functionality of the polyisocyanate is at least 2.0, or at least 2.2, or at least 2.4; and is no greater than 4.0, or no greater than 3.5, or no greater than 3.0. As one skilled in the art will understand, higher functionality may also be used, but may cause excessive cross-linking, and result in an adhesive which is too viscous to handle and apply, and can cause the cured adhesive to be too brittle. In one embodiment, the equivalent weight of the polyisocyanate is at least 80, or at least 110, or at least 120; and is no greater than 300, or no greater than 250, or no greater than 200.

Suitable polyisocyanates include, for example, aromatic polyisocyanates, aliphatic polyisocyanates, cycloaliphatic polyisocyanates, araliphatic polyisocyanates, heterocyclic polyisocyanates, and mixtures thereof. Suitable aromatic polyisocyanates include, for example, m- and p-phenylene diisocyanate; toluene-2,4- and 2,6-diisocyanate (TDI); naphthylene-1,5-diisocyanate; methoxyphenyl-2,4-diisocyanate; diphenylmethane-4,4', 2,4'-, and 2,2'-diisocyanate (MDI); 4,4'-biphenylene diisocyanate; 3,3'-dimethoxy-4,4'-biphenyl diisocyanate; 3,3'-dimethyl-4,4'-biphenyl diisocyanate; 3,3'-dimethyldiphenyl methane-4,4'-diisocyanate; 1,3-bis(isocyanatomethyl)benzene (xylylene diisocyante XDI); 4,4',4"-triphenyl methane triisocyanate; polymethylene polyphenylisocyanate (PMDI); toluene-2,4,6-triisocyanate; 4,4'-dimethyldiphenylmethane-2,2',5,5'-tetraisocyanate; diphenyletherdiisocyanate; 2,4,4'-triisocyanatodiphenylether; chlorophenylene-2,4-diisocyanate; blends thereof and polymeric and monomeric blends thereof. Suitable aliphatic polyisocyanates and cycloaliphatic polyisocyanates include, for example, cyclohexane diisocyanate; 1,3- and 1,4-bis(isocyanatomethyl)cyclohexane; 1-methyl-cyclohexane-2,4-diisocyanate; 1-methyl-cyclohexane-2,6-diisocyanate; methylene dicyclohexane diisocyanate; isophorone diisocyanate; ethylene diisocyanate; 1,6-hexamethylene diisocyanate; blends thereof and polymeric and monomeric blends thereof.

Modified aromatic polyisocyanates that contain urethane, urea, biuret, carbodiimide, uretoneimine, allophonate or other groups formed by reaction of isocyanate groups are also useful. The aromatic polyisocyanates may be MDI or PMDI (or a mixture thereof that is commonly referred to as "polymeric MDI"), and so-called "liquid MDI" products that are mixtures of MDI and MDI derivatives that have biuret, carbodiimide, uretoneimine and/or allophonate linkages.

In one embodiment, at least some of the polyisocyanates present in the isocyanate compounds may be aromatic polyisocyanates. If a mixture of aromatic and aliphatic polyisocyanates are present, 50% or more by number, or 75% or more by number, are aromatic polyisocyanates. In one embodiment, 80 to 98% by number of the polyisocyanates may be aromatic, and 2 to 20% by number may be aliphatic. All of the polyisocyanates used in forming the urethane prepolymers may be aromatic. In a further embodiment, the isocyanate compound includes MDI, e.g., 40 to 99 wt % of the 4,4'-isomer of MDI.

Suitable isocyanate-reactive compounds include, for example, any organic compound having at least two isocyanate-reactive moieties, such as a compound containing an active hydrogen moiety, or an imino-functional compound. As used herein, an active hydrogen moiety refers to a moiety containing a hydrogen atom which, because of its position in the molecule, displays significant activity according to the Zerewitnoff test described by Wohler in the Journal of the American Chemical Society, Vol. 49, p. 3181 (1927). Representative examples of active hydrogen moieties include —COOH, —OH, —NH$_2$, —NH—, —CONH$_2$, —SH, and —CONH—. Suitable active hydrogen containing compounds include, for example, polyols, polyamines, polymercaptans and polyacids. Suitable imino-functional compounds include, for example, those which have at least one terminal imino group per molecule, such as those described in, for example, U.S. Pat. No. 4,910,279.

In one embodiment, the isocyanate-reactive compound is a polyol. Suitable polyols include, for example, polyether polyols, polyester polyols, poly(alkylene carbonate)polyols, hydroxyl containing polythioethers, polymer polyols (dispersions of vinyl polymers in such polyols, commonly referred to as copolymer polyols) and mixtures thereof In one embodiment, the polyols are polyether polyols containing one or more alkylene oxide units in the backbone of the polyol. Suitable alkylene oxide units include, for example, ethylene oxide, propylene oxide, butylene oxide and mixtures thereof. The alkylene oxides can contain straight or branched chain alkylene units. In one embodiment, the polyols contain propylene oxide units, ethylene oxide units or a mixture thereof. In the embodiment where a mixture of alkylene oxide units is contained in a polyol, the different units can be randomly arranged or can be arranged in blocks of each alkylene oxide. In one embodiment, the polyol includes propylene oxide chains with ethylene oxide chains capping the polyol. In another embodiment, the polyols are a mixture of diols and triols.

In one embodiment, the isocyanate-reactive compound can have a functionality of at least 1.5, or at least 1.8, or at least 2.0; and is no greater than 4.0, or no greater than 3.5, or no greater than 3.0. In one embodiment, the equivalent weight of the isocyanate-reactive compound is at least 200, or at least 500, or at least 1,000; and is no greater than 5,000, or no greater than 3,000, or no greater than 2,500.

The urethane prepolymers will have a viscosity sufficient to allow the use of the prepolymers in adhesive formulations. In one embodiment, the prepolymers will have a viscosity of 6,000 centipoise (600 N-S/m$^2$) or greater, or 8,000 centipoise (800 N-S/m$^2$) or greater. In one embodiment, the prepolymers will have a viscosity of 30,000 centipoise (3,000 N-S/m$^2$) or less, or 20,000 centipoise (2,000 N-S/m$^2$) or less. As one skilled in the art will understand, above 30,000 centipoise (3,000 N-S/m$^2$), the polyurethane compositions become too viscous to pump and therefore cannot be applied using conventional techniques. In addition, below 6,000 centipoise (600 N-S/m$^2$), the prepolymers do not afford sufficient integrity to allow the compositions comprising the urethane prepolymers to be utilized in desired applications. As used herein, "viscosity" is measured by the Brookfield Viscometer, Model DV-E with a RV spindle #5 at a speed of 5 revolutions per second and at a temperature of 25° C.

In general, the amount of isocyanate compounds used to prepare the urethane prepolymer is an amount that provides the desired properties, i.e., the appropriate free isocyanate content and viscosities as discussed above. In one embodiment, the amount of the isocyanate compound used to prepare the urethane prepolymer is an amount of 6.5 wt. % or greater, or 7.0 wt. % or greater or 7.5 wt. % or greater, based on the weight of the urethane prepolymer. In one embodiment, the amount of the isocyanate compound used to prepare the urethane prepolymer is an amount of 12 wt. % or less, or 10.5 wt. % or less or 10 wt. % or less, based on the weight of the urethane prepolymer.

The amount of the isocyanate-reactive compound is an amount sufficient to react with most of the isocyanate groups of the isocyanate compound leaving enough isocyanate groups to give the desired free isocyanate content of the urethane prepolymer. In one embodiment, the isocyanate-reactive compound is present in an amount of 30 wt. % or greater, or 35 wt. % or greater or 40 wt. % or greater, based on the weight of the urethane prepolymer. In one embodiment, the isocyanate-reactive compound is present in an amount of 75 wt. % or less, or 65 wt. % or less or 60 wt. % or less, based on the weight of the urethane prepolymer.

The urethane prepolymer may be prepared by any suitable method, such as bulk polymerization and solution polymerization. The reaction to prepare the prepolymer can be carried out under anhydrous conditions, or under an inert atmosphere such as a nitrogen blanket and to prevent crosslinking of the isocyanate groups by atmospheric moisture. The reaction can be carried out at a temperature between 0° C. and 150° C., or between 25° C. and until the residual isocyanate content determined by titration of a sample is very close to the desired theoretical value. In one embodiment, the isocyanate content in the prepolymers can be 0.1 wt. % or greater, or 1.5 wt. % or greater or 1.8 wt. % or greater. In one embodiment, the isocyanate content in the prepolymers can be 10 wt. % or less, or 5 wt. % or less or 3 wt. % or less. The term "isocyanate content" as used herein means the weight percentage of isocyanate moieties to the total weight of the prepolymer.

The reactions to prepare the urethane prepolymer may be carried out in the presence of urethane catalysts. Suitable urethane catalysts include, for example, the stannous salts of carboxylic acids, such as stannous octoate, stannous oleate, stannous acetate, and stannous laurate; dialkyltin dicarboxylates, such as dibutyltin dilaurate and dibutyltin diacetate which are known in the art as urethane catalysts; as are tertiary amines and tin mercaptides. The amount of catalyst employed is generally between 0.005 and 5 wt. % of the mixture catalyzed, depending on the nature of the isocyanate.

In general, the urethane prepolymer is present in the polyurethane adhesive composition according to the present invention in a sufficient amount such that the adhesive is capable of bonding substrates together. In one embodiment, the urethane prepolymer is present in an amount of 20 wt. % or greater, or 30 wt. % or greater, or 40 wt. % or greater, or wt. % or greater, based on the weight of the polyurethane adhesive composition. In one embodiment, the urethane prepolymer is present in an amount of 85 wt. % or less, or 80 wt. % or less, or 75 wt. % or less, or 70 wt. % or less, based on the weight of the polyurethane adhesive composition. In one embodiment, the urethane prepolymer is present in an amount of 30 wt. % to 65 wt. %, based on the weight of the polyurethane adhesive composition. In one embodiment, the prepolymer is present in an amount of 55 wt. % to 62 wt. %, based on the weight of the polyurethane adhesive composition.

The polyurethane adhesive composition according to the present invention further includes one or more catalysts which catalyze the reaction of isocyanate moieties with water or an active hydrogen containing compound. The catalyst can be any catalyst known to the skilled artisan for the reaction of isocyanate moieties with water or active hydrogen containing compounds. In one embodiment, one or more catalysts containing one or more tertiary amine groups, organotin catalysts, metal alkanoates catalysts, and mixtures thereof may be used.

Suitable one or more catalysts containing one or more tertiary amine groups include, for example, dimorpholinodialkyl ethers, di((dialkylmorpholino)alkyl)ethers, substituted morpholine compounds, N-dialkyl amino alkyl ethers and alkyl substituted polyalkylene polyamines. In one embodiment, suitable one or more catalysts include, for example, bis-(2-dimethylaminoethyl)ether; triethylene diamine; pentamethyldiethylene triamine; N,N-dimethylcyclohexylamine; N,N-dimethyl piperazine 4-methoxyethyl morpholine; N-methylmorpholine; N-ethyl morpholine and mixtures thereof. In one embodiment, a class of catalyst is dimorpholino dialkyl ethers wherein the morpholine groups may be substituted with groups which do not interfere in the catalytic affect of the catalyst. Suitable dimorpholinodialkyl ether includes, for example, dimorpholinodiethyl ether. In one embodiment, the one or more catalysts containing one or more tertiary amine groups are present in an amount of 0.01 wt. % or greater, or 0.03 wt. % or greater, based on the weight of the polyurethane adhesive composition. In one embodiment, the one or more catalysts containing one or more tertiary amine groups are present in an amount of 2.0 wt. % or less, or 1.75 wt. % or less, or 1.0 wt. % or less, or 0.5 wt. % or less, based on the weight of the polyurethane adhesive composition. In one embodiment, the one or more catalysts containing one or more tertiary amine groups are present in an amount of 0 wt. % to 1 wt. % or less, based on the weight of the polyurethane adhesive composition. In one embodiment, the one or more catalysts containing one or more tertiary amine groups are present in an amount of 0.03 wt. % to 0.5 wt. % or less, based on the weight of the polyurethane adhesive composition.

Suitable one or more organotin catalysts include, for example, alkyl tin oxides, stannous alkanoates, dialkyl tin carboxylates and tin mercaptides. Suitable stannous alkanoates include, for example, stannous octoate. Suitable alkyl tin oxides include, for example, dialkyl tin oxides, such as dibutyl tin oxide and its derivatives. In one embodiment, an organotin catalyst is a dialkyltin dicarboxylate or a dialkyltin dimercaptide. Suitable dialkyl dicarboxylates include, for example, 1,1-dimethyltin dilaurate; 1,1-dibutyltin diacetate and 1,1-dimethyl dimaleate. Suitable metal alkanoates include, for example, bismuth octoate and bismuth neodecanoate. In one embodiment, the organo tin compound or metal alkanoate is present in an amount of 60 parts per million or greater, or 120 parts by million or greater, based on the weight of the polyurethane adhesive composition. In one embodiment, the organo tin compound or metal alkanoate is present in an amount of 2.0 percent or less, or 1.5 wt. % or less, based on the weight of the polyurethane adhesive composition. In one embodiment, the organo tin compound or metal alkanoate is present in an amount of 0.1 wt. % to 1.6 wt. % or less, based on the weight of the polyurethane adhesive composition. In one embodiment, the organo tin compound or metal alkanoate is present in an amount of 0.6 wt. % to 1.3 wt. % or less, based on the weight of the polyurethane adhesive composition.

In one embodiment, the catalytic amount of the one or more catalysts is an amount of 0.3 wt. % or greater, or 0.5 wt. % or greater, based on the weight of the polyurethane adhesive composition. In one embodiment, the catalytic amount of the one or more catalysts is an amount of 3.5 percent or less, or 3 wt. % or less, based on the weight of the polyurethane adhesive composition. In one embodiment, the catalytic amount of the one or more catalysts is an amount of 0.63 wt. % to 1.8 wt. %, based on the weight of the polyurethane adhesive composition. In one embodiment, the catalytic amount of the one or more catalysts is an amount of 0.1 wt. % to 2.6 wt. %, based on the weight of the polyurethane adhesive composition.

The polyurethane adhesive composition according to the present invention further includes one or more fillers and to improve the strength and rheology of the composition. Suitable fillers include, for example, an inorganic filler such as glass, silica, boron oxide, boron nitride, titanium oxide, titanium nitride, fly ash, calcium carbonate, various alumina-silicates including clays such as wollastonite and kaolin, metal particles such as iron, titanium, aluminum, copper, brass, bronze and the like; thermoset polymer particles such as polyurethane, cured particles of an epoxy, phenol-formaldehyde, or cresol-formaldehyde resin, crosslinked polystyrene and the like; thermo-plastics such as polystyrene, styrene-acrylonitrile copolymers, polyimide, polyamide-imide, polyether ketone, polyether-ether ketone, polyethyleneimine, poly(p-phenylene sulfide), polyoxymethylene, polycarbonate and the like; and various types of carbon such as activated carbon, graphite, carbon black and the like.

When calcium carbonate is used as a filler, the calcium carbonate functions as a white pigment in the composition. Suitable calcium carbonates include, for example, any standard calcium carbonate. Suitable standard calcium carbonates are untreated, that is, they are not modified by treatment with other chemicals, such as organic acids or esters of organic acids. In one embodiment, the polyurethane adhesive composition according to the present invention includes calcium carbonate as the only white pigment.

In general, the one or more calcium carbonates are present in a sufficient amount such that the desired adhesive properties of the polyurethane adhesive composition are achieved. In one embodiment, the one or more calcium carbonates are present in an amount of 5 wt. % or greater, or 8 wt. % or greater, or 12 wt. % or greater, based on the weight of the polyurethane adhesive composition. In one embodiment, the one or more calcium carbonates are present in an amount of 25 wt. % or less, or 20 wt. % or less, or 18 wt. % or less, based on the weight of the polyurethane adhesive composition. In one embodiment, the one or more calcium carbonates are present in an amount of 8 wt. % to 20 wt. %, based on the weight of the polyurethane adhesive composition. In one embodiment, the one or more calcium carbonates are present in an amount of 12 wt. % to 18 wt. %, based on the weight of the polyurethane adhesive composition.

When carbon black is used as a filler, the carbon black used may be a standard carbon black. Standard carbon black is carbon black which is not specifically surface treated or oxidized to render it nonconductive. Nonconductivity is generally understood to mean an impedance of the composition of at least $10^{10}$ Ohm-cm. One or more nonconductive carbon blacks may be used in conjunction with the standard carbon black. The non-conductive carbon blacks may be high surface area carbon blacks, which exhibit an oil absorption of 110 cc/100 g or greater, or 115 cc/100 g or greater and/or an iodine number of 130 mg/g or greater, or 150 mg/g or greater. Suitable non-conductive carbon blacks include, for example, ELFTEX™ 57100 (available from Cabot), RAVEN™ 1040 and RAVEN™ 1060 carbon blacks (available from Birla Carbon). Suitable standard carbon blacks are well known in the art and include, for example, RAVEN™ 790, RAVEN™ 450, RAVEN™ 500, RAVEN™ 430, RAVEN™ 420 and RAVEN™ 410 carbon blacks (available from Birla Carbon) and CSX™ carbon blacks (available from Cabot), and PRINTEX™ carbon black (available from Degussa).

In general, the one or more forms of carbon black are present in the polyurethane adhesive composition according to the present invention in a sufficient amount to reinforce the composition and to improve the rheology of the composition. In one embodiment, the one or more forms of carbon black are present in an amount such that the parts of the composition are nonconductive. In one embodiment, the one or more forms of carbon black are present in an amount of 10 wt. % or greater, or 14 wt. % or greater, or 18 wt. % or greater, based on the weight of the polyurethane adhesive composition. In one embodiment, the one or more forms of carbon black are present in an amount of 35 wt. % or less, or 30 wt. % or less, or 25 wt. % or less, based on the weight of the polyurethane adhesive composition. In one embodiment, the one or more forms of carbon black are present in an amount of 15 wt. % to 23 wt. %, based on the weight of the polyurethane adhesive composition. In one embodiment, the one or more forms of carbon black are present in an amount of 19 wt. % to 23 wt. %, based on the weight of the polyurethane adhesive composition.

In general, the one or more fillers are present in the polyurethane adhesive composition according to the present invention in a sufficient amount to reinforce the composition and to improve the rheology of the composition. In one embodiment, the one or more fillers may constitute 15 wt. % or greater, based on the total weight of the polyurethane adhesive composition. In one embodiment, the one or more fillers may constitute 20 wt. % or greater, based on the total weight of the polyurethane adhesive composition. In one embodiment, the one or more fillers may constitute 50 wt. % or less, based on the total weight of the polyurethane adhesive composition. In one embodiment, the one or more fillers may constitute 35 wt. % or less, based on the total weight of the polyurethane adhesive composition.

In one embodiment, a polyurethane adhesive composition according to the present invention does not contain clay in any form as a filler.

The polyurethane adhesive composition according to the present invention further includes one or more silane adhesion promoters in order to facilitate a durable bond between the polyurethane adhesive and, for example, a glass surface. In one embodiment, the one or more silane adhesion promoters are those which do not have a functional group which forms a salt with an acidic compound. In one embodiment, suitable one or more silane adhesion promoters include, for example, one or more alkoxysilanes. In one embodiment, suitable one or more alkoxysilanes are those react with isocyanate moieties. Suitable alkoxysilanes include, for example, mercaptosilanes, aminosilanes, isocyanato silanes, epoxy silanes, acrylic silanes and vinyl silanes. In one embodiment, suitable alkoxysilanes are trialkoxysilanes such as trimethoxy silanes.

In one preferred embodiment, a class of alkoxysilanes is mercaptosilanes. "Mercaptosilanes" as used herein refer to any molecule having both a mercapto and a silane group which enhances the adhesion of polyurethane adhesive to a glass surface. Suitable mercaptosilanes include, for example, mercapto alkyl di- or tri-alkoxysilanes. In one embodiment, a suitable mercaptosilane can be of the general formula:

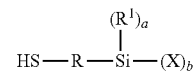

wherein R is a hydrocarbylene group, $R^1$ is independently an alkyl group having 1 to 20 carbon atoms, an aryl group having 6 to 20 carbon atoms, an aralkyl group having 7 to 20 carbon atoms or a triorganosiloxy group represented by $(R^2)_3SiO-$, wherein each of the $R^2$ groups independently represents a monovalent hydrocarbon group having 1 to 20 carbon atoms; X is independently a hydroxyl group or a hydrolyzable group; a is independently 0, 1 or 2; b is independently 0, 1, 2 or 3; and the sum of a and b is 3.

The hydrolyzable group represented by X is not limited and can be any conventional hydrolyzable group. Suitable hydrolyzable groups include, for example, a hydrogen atom, a halogen atom, an alkoxy group, an acyloxy group, a ketoximate group, an amino group, an amido group, an acid amido group, an amino-oxy group, a mercaptosilane group, and an alkenyloxy group. In one embodiment, the one or more hydrolyzable groups include a hydrogen atom, an alkoxy group, an acyloxy group, a ketoximate group, an amino group, an amido group, an amino-oxy group, a mercaptosilane group, and an alkenyloxy group. In one embodiment, the one or more hydrolyzable groups are alkoxy groups such as, for example, a methoxy or ethoxy group, for ease in handling due to their mild hydrolyzability. Where two or more hydroxyl groups or hydrolyzable groups are present per reactive silicon group, they may be the same or different. In one embodiment, $R^1$ is an alkyl group, e.g., methyl or ethyl; a cycloalkyl group, e.g., cyclohexyl; an aryl group, e.g., phenyl; an aralkyl group, e.g., benzyl; or a triogansiloxy group of formula $(R^2)_3Si$— in which $R^2$ is methyl or phenyl. In another embodiment, $R^1$ and $R^2$ are a methyl group. In another embodiment, R is an arylene, alkarylene or an alkylene group such as a $C_2$ to $C_8$ alkylene group, or a $C_2$ to $C_4$ alkylene group or a $C_2$ to $C_3$ alkylene group.

Representative examples of suitable one or more silane adhesion promoters include mercaptosilane propyl trimethoxysilane, mercaptosilane propyl methyl dimethoxysilane, bis-(trimethoxysilylpropyl)amine, isocyanato trimethoxysilane, N,N-bis[(3-triethoxysilyl)propyl]amine, N,N-bis[(3-tripropoxy-silyl)propyl]amine, N-(3-trimethoxysilyl)propyl-3-[N-(3-trimethoxysilyl)-propyl amino]propion-amide, N-(3-triethoxysilyl)propyl-3-[N-3-triethoxysilyl)-propyl-amino]propion amide, N-(3-trimethoxysilyl)propyl-3-[N-3-triethoxy silyl)-propylamino]propionamide, 3-trimeth-oxysilyl propyl 3-[N-(3-trimethoxysilyl)-propyl amino]-2-methyl propionate, 3-triethoxysilyl propyl 3-[N-(3-triethoxysilyl)-propylamino]-2-methyl propionate, and 3-trimethoxysilylpropyl 3-[N-(3-triethoxy silyl)-propylamino]-2-methyl propionate.

In general, the one or more silane adhesion promoters are present in a sufficient amount to enhance the bonding of the isocyanate functional adhesive to the substrate, or glass or coated plastic surface. In one embodiment, the one or more silane adhesion promoters are present in an amount of 0.1 wt. % or more, or 0.4 wt. % or more, or 0.7 wt. % or more, or 1.0 wt. % or more, based on the weight of the polyurethane adhesive composition. In one embodiment, the one or more silane adhesion promoters are present in an amount of 5 wt. % or less, or 3 wt. % or less, or 2 wt. % or less, or 1.5 wt. % or less, based on the weight of the polyurethane adhesive composition. In one embodiment, the one or more silane adhesion promoters are present in an amount of 0.7 wt. % to 3 wt. % or less, based on the weight of the polyurethane adhesive composition. In one embodiment, the one or more silane adhesion promoters are present in an amount of 1.2 wt. % to 1.7 wt. % or less, based on the weight of the polyurethane adhesive composition.

The polyurethane adhesive composition according to the present invention further includes one or more monofunctional polyalkylene glycols. In general, the monofunctional polyalkylene glycol has a reactive hydrogen moiety on one end of its chain and an inert unreactive moiety on the other end. The reactive hydrogen moiety can be, for example, a primary or secondary amine or a hydroxyl moiety. In one embodiment, the reactive hydrogen moiety is a hydroxyl moiety. It is believed that when forming the polyurethane adhesive composition of the present invention, the reactive hydrogen moiety of the monofunctional polyalkylene glycols will react in situ with the isocyanate moieties of the urethane prepolymers, such that the residue of monofunctional polyalkylene glycols form the terminal groups of the urethane prepolymer, i.e., the urethane prepolymers are capped with the residue of the monofunctional polyalkylene glycols. In accordance with the present invention, within the polyurethane adhesive compositions, the one or more monofunctional polyalkylene glycols are incorporated in a substoichiometric amount over the isocyanate moieties of the urethane prepolymers, such that the urethane prepolymers are partially capped with the residue of the monofunctional polyalkylene glycols. In one embodiment, about 0.1-50 mol %, or about 1-20 mol %, or about 2-10 mol % of the isocyanate moieties of the urethane prepolymers are reacted with the reactive hydrogen moieties of the one or more monofunctional polyalkylene glycols.

The inert unreactive moiety can be any moiety which does not react with isocyanates such as, for example, a hydrocarbyloxy moiety. Suitable hydrocarbyloxy moieties include, for example, alkoxy, aryloxy, and alkylaryloxy. In one embodiment, the hydrocarbyloxy moiety is an alkoxy. Suitable alkoxy moieties include, for example, a $C_1$ to $C_{20}$ alkoxy, or a $C_1$ to $C_{12}$ alkoxy, or a $C_1$ to $C_6$ alkoxy or a $C_1$ to $C_4$ alkoxy.

In one embodiment, a monofunctional polyalkylene glycol is a monofunctional hydroxyl substituted hydrocarbon initiated polyalkylene glycol which includes at one terminal end a hydrocarbyloxy moiety and at the other end a reactive hydrogen group. In between the terminal groups are a plurality of alkylene oxide moieties. Alternatively the compound can be referred to as a monofunctional hydrocarbyloxy polyalkyleneoxy glycol. In one embodiment, suitable alkylene oxide moieties can comprise ethylene oxide moieties, propylene oxide moieties, butylene oxide moieties or a mixture thereof.

In one embodiment, the one or more monofunctional polyalkylene glycols are represented by general formula I and II:

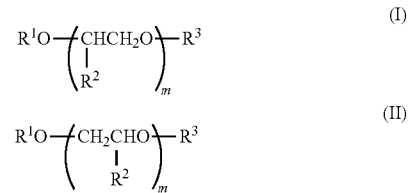

wherein $R^1$ and $R^3$ are independently a $C_1$ to $C_{20}$ hydrocarbyl group such an aliphatic or aromatic group with linear or branched structure and which may contain one or more unsaturated bonds, or hydrogen, with the proviso that one of $R^1$ and $R^3$ is hydrogen; each $R^2$ is independently hydrogen, methyl, or ethyl; and m is an integer of 1 to 20. In one embodiment, $R^1$ and $R^3$ are independently a $C_1$ to $C_{12}$ hydrocarbyl group, or a $C_1$ to $C_6$ hydrocarbyl group or a $C_1$ to $C_4$ hydrocarbyl group. In one embodiment, $R^1$ and $R^3$ are independently a $C_1$ to $C_{20}$ alkoxy, or a $C_1$ to $C_{12}$ alkoxy, or a $C_1$ to $C_6$ alkoxy or a $C_1$ to $C_4$ alkoxy. The one or more monofunctional polyalkylene glycols can be made by methods known in the art or are commercially available such as PAG-15 from The Dow Chemical Company.

The one or more monofunctional polyalkylene glycols can have a number average molecular weight of 200 or greater, or 500 or greater. In one embodiment, the number average molecular weight of the monofunctional polyalkylene glycol is 2,000 or less, or from 1,000 or less.

In general, the one or more monofunctional polyalkylene glycols are present in an amount of 0.1 wt. % or more, or 0.4 wt. % or more, or 0.8 wt. % or more, based on the weight of the polyurethane adhesive composition. In one embodiment, the one or more monofunctional polyalkylene glycols are present in an amount of 5 wt. % or less, or 3 wt. % or less, or 2 wt. % or less, or 1.5 wt. % or less, based on the weight of the polyurethane adhesive composition. In one embodiment, the one or more monofunctional polyalkylene glycols are present in an amount of 0.4 wt. % to 2 wt. %, based on the weight of the polyurethane adhesive composition. In one embodiment, the one or more monofunctional polyalkylene glycols are present in an amount of 0.6 wt. % to 1.3 wt. %, based on the weight of the polyurethane adhesive composition.

The polyurethane adhesive composition according to the present invention may further include one or more of the same or different dispersing aids, which wet the surface of the filler particles and help them disperse. The one or more dispersing aids may also have the effect of reducing viscosity. Suitable one or more dispersing aids include, for example, dispersing aids which are commercially available and sold by such sources as BYK Chemie under the BYK, DISPERBYK and ANTI-TERRA-U tradenames, such as alkylammonium salt of a low-molecular-weight polycarboxylic acid polymer and salts of unsaturated polyamine amides and low-molecular acidic polyesters, and fluorinated surfactants such as FC-4430, FC-4432 and FC-4434 from 3M Corporation. Such dispersing aids may constitute, for example, up to 2 wt. %, or up to 1 wt. %, of the polyurethane adhesive composition.

The polyurethane adhesive composition according to the present invention may further include one or more desiccants such as, for example, fumed silica, hydrophobically modified fumed silica, silica gel, aerogel, various zeolites and molecular sieves, and the like. One or more desiccants may constitute 1 wt. % or greater, or 5 wt. % or less, or 4 wt. % or less, based on the total weight of the polyurethane adhesive composition. In one embodiment, the polyurethane adhesive composition does not include a desiccant.

The polyurethane adhesive composition according to the present invention may further include one or more plasticizers or solvents to modify rheological properties to a desired consistency. The one or more plasticizers or solvents should be free of water, inert to isocyanate groups and compatible with the prepolymer. The one or more plasticizers or solvents may be added to the reaction mixtures for preparing the prepolymer, or to the mixture for preparing the final adhesive composition. In one embodiment, the one or more plasticizers or solvents are added to the reaction mixtures for preparing the prepolymer and the adduct, so that such mixtures may be more easily mixed and handled. Suitable plasticizers and solvents are well known in the art and include, for example, straight and branched alkylphthalates, such as diisononyl phthalate, dioctyl phthalate and dibutyl phthalate, a partially hydrogenated terpene commercially available as "HB-40", trioctyl phosphate, epoxy plasticizers, toluene-sulfamide, chloroparaffins, adipic acid esters, castor oil, xylene, 1-methyl-2-pyrrolidinone and toluene. The amount of plasticizer used is that amount sufficient to give the desired rheological properties and disperse the components in the composition of the invention. In one embodiment, the one or more plasticizers are present in an amount of 0 wt. % or greater, or 5 wt. % or greater, or 10 wt. % or greater, based on the weight of the polyurethane adhesive composition. In one embodiment, the one or more plasticizers are present in an amount of 35 wt. % or less, or 30 wt. % or less, or 25 wt. % or less, based on the weight of the polyurethane adhesive composition.

The polyurethane adhesive composition according to the present invention may further include one or more stabilizers, which function to protect the composition from moisture, thereby inhibiting advancement and preventing premature crosslinking of the isocyanates or silanol groups in the composition. Suitable one or more stabilizers include, for example, diethylmalonate, alkylphenol alkylates, paratoluene sulfonic isocyanates, benzoyl chloride, calcium oxide and orthoalkyl formates. In one embodiment, the one or more stabilizers are present in an amount of 0.1 wt. % or greater, or 0.5 wt. % or greater or wt. % or greater, based on the weight of the polyurethane adhesive composition. In one embodiment, the one or more stabilizers are present in an amount of 5.0 wt. % or less, or 2.0 wt. % or less, or 1.4 wt. % or less, based on the weight of the polyurethane adhesive composition.

The polyurethane adhesive composition according to the present invention may further include one or more curing agents. Suitable one or more curing agents include, for example, one or more chain extenders, crosslinking agents, polyols or polyamines. Polyols as described hereinabove can be utilized as curing agents. The one or more curing agents may include one or more low molecular weight compounds having two or more isocyanate reactive groups and a hydrocarbon backbone wherein the backbone may further include one or more heteroatoms. Suitable low molecular weight compounds may be compounds known in the art as chain extenders, difunctional compounds, or crosslinkers, having, on average, greater than two active hydrogen groups per compound. The heteroatoms in the backbone can be oxygen, sulfur, nitrogen or a mixture thereof. In one embodiment, the molecular weight of the low molecular weight compound is 250 or less, or 120 or less, or 100 or less. The low molecular weight compound includes one or more multifunctional alcohols, multifunctional alkanol amines, one or more adducts of multifunctional alcohol and an alkylene oxide, one or more adducts of a multifunctional alkanol amine and an alkylene oxide or a mixture thereof. Suitable multifunctional alcohols and multifunctional alkanol amines include, for example, ethane diol, propane diol, butane diol, hexane diol, heptane diol, octane diol, glycerine, trimethylol propane, pentaerythritol, neopentyl glycol, ethanol amines (di-ethanol amine, triethanol amine) and propanol amines (di-isopropanol amine, tri-isopropanol amine).

In general, the one or more curing agents are used in a sufficient amount to obtain the desired G-Modulus (E-Modulus). In one embodiment, the one or more curing agents are present in an amount of 2 wt. % or greater, or 2.5 wt. % or greater, or 3.0 wt. % or greater, based on the weight of the polyurethane adhesive composition. In one embodiment, the one or more curing agents are present in an amount of 10 wt. % or less, or 8 wt. % or less, or 6 wt. % or less, based on the weight of the polyurethane adhesive composition.

The polyurethane adhesive composition according to the present invention may further include a polyoxyalkylene polyamine having 2 or more amines per polyamine. In one embodiment, the polyoxyalkylene polyamine can have 2 to 4 amines per polyamine or 2 to 3 amines per polyamine. In one embodiment, the polyoxyalkylene polyamine can have a weight average molecular weight of 200 or greater, or 400 or greater. In one embodiment, the polyoxyalkylene polyamine can have a weight average molecular weight of 5,000 or less or 3,000 or less. Suitable polyoxyalkylene polyamines include, for example, Jeffamine™ D-T-403 polypropylene oxide triamine having a molecular weight of 400 and Jeffamine™ D-400 polypropylene oxide diamine having a molecular weight of 400. In one embodiment, the polyoxyalkylene polyamines are present in an amount of 0.2 wt. % or greater, or 0.3 wt. % or greater, or 0.5 wt. % or greater, based on the total weight of the polyurethane adhesive composition. In one embodiment, the polyoxyalkylene polyamines are present in an amount of 6 wt. % or less, or 4 wt. % or less, or 2 wt. % or less, based on the total weight of the polyurethane adhesive composition.

The polyurethane adhesive composition according to the present invention may further include other durability stabilizers known in the art, including alkyl substituted phenols, phosphites, sebacates and cinnamates and preferably organophosphites. The durability stabilizers are present in a sufficient amount to enhance the durability of bond of the polyurethane adhesive composition to the substrate surface. Suitable phosphites include, for example, poly(dipropyleneglycol)phenyl phosphite (available from Dover Chemical Corporation under the trademark and designation DOVERPHOS 12), tetrakis isodecyl 4,4'isopropylidene diphosphite (available from Dover Chemical Corporation under the trademark and designation DOVERPHOS 675), and phenyl diisodecyl phosphite (available from Dover Chemical Corporation under the trademark and designation DOVERPHOS 7). In one embodiment, the one or more durability stabilizers are present in an amount of 0.1 wt. % or greater, or 0.2 wt. % or greater, based on the total weight of the polyurethane adhesive composition. In one embodiment, the one or more durability stabilizers are present in an amount of 1.0 wt. % or less, or 0.5 wt. % or less, based on the total weight of the polyurethane adhesive composition.

The polyurethane adhesive composition according to the present invention may further include one or more light stabilizers, which facilitates the system maintaining durable bond to the substrate for a significant portion of the life of the structure to which it is bonded. Suitable one or more light stabilizers include, for example, hindered amine light stabilizers, such as Tinuvin 1,2,3 bis-(1-octyloxy-2,2,6,6, tetramethyl-4-piperidinyl)sebacate and Tinuvin 765, bis(1,2,2,6,6,-pentamethyl-4-piperidinyOsebacate. In one embodiment, the one or more light stabilizers are present in an amount of 0.1 wt. % or greater, or 0.2 wt. % or greater, or 0.3 wt. % or greater, based on the total weight of the polyurethane adhesive composition. In one embodiment, the one or more light stabilizers are present in an amount of 3 wt. % or less, or 2 wt. % or less, or 1 wt. % or less, based on the total weight of the polyurethane adhesive composition.

The polyurethane adhesive composition according to the present invention may further include one or more ultraviolet (UV) light absorbers, which enhances the durability of the bond of the composition to a substrate. Suitable one or more ultraviolet light absorbers include, for example, benzophenones and benzotriazoles, such as Cyasorb UV-531 2-hydroxy-4-n-octoxybenzophenone and Tinuvin 571 2-(2H-benzotriazol-2-yl)-6-dodecyl-4-methylphenol, branched and linear. In one embodiment, the one or more UV light absorbers are present in an amount of 0.1 wt. % or greater, or 0.2 wt. % or greater, or 0.3 wt. % or greater, based on the total weight of the polyurethane adhesive composition. In one embodiment, the one or more UV light absorbers are present in an amount of 3 wt. % or less, or 2 wt. % or less, or 1 wt. % or less, based on the total weight of the polyurethane adhesive composition.

The polyurethane adhesive composition according to the present invention can be formed by blending the components together by methods well known in the art. For example, the components can be blended in a suitable mixer. Such blending can be conducted, for example, in an inert atmosphere and in the absence of atmospheric moisture to prevent premature reaction. The mixing of the components can be done in any convenient way, depending on the particular application and available equipment. Mixing of the components can be done batchwise, mixing them by hand or by using various kinds of batch mixing devices, followed by application by brushing, pouring, applying a bead and/or in other suitable manner. In one embodiment, once the composition is formulated, it can be packaged in a suitable container such that it is protected from atmospheric moisture. Contact with atmospheric moisture could result in premature cross-linking of the urethane prepolymer utilized in the compositions of the invention.

The polyurethane adhesive composition according to the present invention is used to bond porous and nonporous substrates together. For example, the polyurethane adhesive composition is applied to a first substrate and the polyurethane adhesive composition on the first substrate is then contacted with a second substrate. Thereafter, the polyurethane adhesive composition is exposed to curing conditions. In one embodiment, one substrate is glass or clear plastic coated with an abrasion resistant coating and the other substrate is a plastic, metal, fiberglass or composite substrate which may optionally be painted or coated. The plastic coated with an abrasion resistant coating can be any plastic which is clear, such as polycarbonate, acrylic, hydrogenated polystyrene or hydrogenated styrene conjugated diene block copolymers having greater than 50 percent styrene content. The coating can include any coating which is abrasion resistant such as a polysiloxane coating. In one embodiment, the coating has an ultraviolet pigmented light blocking additive. In one embodiment, the glass or coated plastic window has an opaque coating disposed in the region to be contacted with the adhesive to block UV light from reaching the adhesive. This is commonly referred to as a frit. In one embodiment, the opaque coating is an inorganic enamel or an organic coating.

In one embodiment, the polyurethane adhesive composition according to the present invention can be applied to the surface of the glass or coated plastic, along the portion of the glass or coated plastic which is to be bonded to the structure. The polyurethane adhesive composition is thereafter contacted with the second substrate such that the polyurethane adhesive composition is disposed between the glass or coated plastic and the second substrate. The polyurethane adhesive composition is allowed to cure to form a durable bond between the glass or coated plastic and the substrate. Generally, the polyurethane adhesive composition according to the present invention can be applied at an ambient temperature in the presence of atmospheric moisture. Exposure to atmospheric moisture is sufficient to result in curing of the polyurethane adhesive composition. Curing may be further accelerated by applying heat to the curing composition by means of convection heat, or microwave heating. In another embodiment, the composition may be applied to the surface of the other substrate and then contacted with the glass or coated plastic as described. In one embodiment, the polyurethane adhesive composition according to the present invention can be applied to the surface in the absence of a pre-treatment step.

In one embodiment, the polyurethane adhesive composition according to the present invention can be applied to fill gaps in structures and allowed to cure to seal about gaps in structures such as buildings or in vehicles. The polyurethane adhesive compositions can be applied as described hereinabove. In buildings, the polyurethane adhesive compositions can be used to seal gaps in structures. In vehicles, the polyurethane adhesive compositions can be utilized to seal gaps or seams between pans that may allow water to get in, for example, automobiles, buses, trucks, trailers, rail cars and specialty vehicles having such a gap or seal, such as about windows, door frames, trim, between body panels, and between door parts.

Further handling may include, for example, transporting the assembly to a downstream work station, and further manufacturing steps which might include joining the assembly to one or more other components, various shaping and/or machining steps, the application of a coating, and the like. The completion of the cure can take place during and/or after such additional handling steps.

Molecular weights as described herein are number average molecular weights which may be determined by Gel Permeation Chromatography (also referred to as GPC).

The following examples are provided to illustrate the disclosed compositions, but are not intended to limit the scope thereof. All parts and percentages are by weight unless otherwise indicated.

The following designations, symbols, terms and abbreviations are used in the examples below:

Prepolymer 1 is a MDEPPO based Prepolymer. The prepolymer is a polyether polyurethane prepolymer prepared by mixing 22.571 g of a polyoxypropylene diol having an average molecular weight of 2000 g/mol commercially available under the trade name Voranol 2000L with 33.132 g of a polyoxypropylene triol having an average molecular weight of 4650 g/mol and commercially available under the trade name Arcol CP 4655. 33.779 g of plasticizer agent and 9.501 g diphenylmethane 4,4'-diisocyanate were added. Afterwards, 0.001 g of orthophsphoric acid in 0.009 g methyl ethyl ketone and 1 g of diethylmalonate were added. Then, the entire mixture was heated to 50° C. in a reactor and g of stannous octoate and was added. The reaction was carried out for 1 hour at 50° C. The resultant prepolymer is referred to herein as NCO-prepolymer.

Prepolymer 2 is an Isocyanate Functional Polyester Prepolymer.

The prepolymer was prepared by mixing 46.7 g of plasticizer agent (branched plasticizer), 30.15 g of a iscocyanate (Diphenylmethane 4,4'-diisocyanate) commercially available under the trade name Isonate M125U with 190.0 g of a polyester polyol commercially available under the trade name DYNACOL 7381. Then, the entire mixture was stirred for 8 hours.

Vestinol 9 is Diisononylphtalate having a molecular weight: 418.6 g/mol, available from Evonik.

Aerosil R208 is pyrogenic silica having a BET surface: ca. 80 to 140 m2/g, available from Evonik.

Printex 30 is carbon black, available from Orion Carbons.

Carbital 120 is uncoated calcium carbonate having a surface area BET: 2 m2/g, available from Imerys.

DEM is diethyl malonate.

Desmodure N3300 is a HDI-trimerisat, hexamethylene diisocyanate trimer having an NCO content: 21.8±0.3% and a viscosity at 23° C.: 3.000±750 mPa*s, available from Covestro.

VORANATE M600 is a polymeric MDI (polymeric methylene diphenyl diisocyanate) having an isocyanate equiv. of 137 to 139, and isocyanate content of 30.2 to 31.1 and a viscosity at 25° C. of 520 to 680 mPa*s, available from DOW.

SILQUEST A189 is gamma-mercaptopropyltrimethoxysilane, available from Momentive.

SILQUEST A1170 is bis-(trimethoxysilylpropyl)amine, available from Momentive.

DMDEE is 2,2'-dimorpholinodiethylether, available from BASF.

UL28+Vestinol is a dimethyl-tin-dilaureate/Vestinol mixture. The mixture is prepared by adding 0.24 g catalyst UL28 to 9.76 g Vestinol 9 plasticizer. After stirring the solution became filled into a flask under dry nitrogen to exclude moisture.

PAG-15 is a monofunctional polyalkylene glycol, available from DOW, having a chain length of $C_{12}$ to $C_{15}$, plus units of propylene oxide resulting in a molecular weight of 1100 g/mol.

Preparation of Adhesive Compositions

The polyurethane adhesive compositions set forth below in Table 1 were prepared as follows. A planetary mixture was charged with the stated amounts of PPO based prepolymer 1 as well as with all liquid additives (DEM, silanes, Vestinol 9, Voranate M600, Desmodur N3300 and PAG-15). The mixture was stirred for 35 minutes under vacuum at room temperature. Then the appropriate amounts of carbon black, calcium carbonate and Aerosil R208 were added. The mixture was then stirred and heated until 60° C. to 70° C. under an atmosphere of nitrogen and subsequently 35 minutes under vacuum. When the temperature exceeded 60° C., the appropriate amount of polyester prepolymer 2 was added into the planetary mixer and stirred for another 10 minutes. Then the appropriate amounts of diisononylphtalate added as Vestinol 9, the UL28+Vestinol catalyst and the DMDEE catalyst were added and the mixture was stirred 15 minutes under vacuum or until a homogeneous pasteous black mixture was observed.

Testing and Analytical Procedures

Substrates: The following ceramic frit types were used SGS Ferro 14305, SGS Ferro 14502 and PLK Johnson Matthey C 24-8708 IR-9872-L.

Substrate Preparation. Adhesive application with nozzle and applicator. The polyurethane adhesive compositions were applied to the unprimed ceramic fit types discussed above using the applicator. The adhesive bead was flattened to rectangular shape with a spatula. The test specimens were then stored for the desired cure time and environmental conditions listed at Table 1.

Peel testing of cured bead on glass substrate was then carried out after the following climate conditions listed below in Table 1.

TABLE 1

| Condition | Testing Temperature | Details | Conditioning before testing | Duration |
|---|---|---|---|---|
| 7 D RT Cycle | RT | 7 days at 23° C./50% r.h. | na | 7 days |
| 7 D 90° C. | RT | 7 days at 90° C. | +1 hour at 23° C. | 7 days + 1 h |
| 7 D Climate Change Cycle | RT | 4x (16 hours at 38° C./98% r.h. + 4 hours at −40° C. + 4 hours at 80° C.) | at 23° C. for 72 hours before testing | 7 days |
| 14 D Cataplasma | RT | 14 days at 70° C./100% r.h. | −20° C. for 2 hours and 2 hours at 23° C. | 14 days |

The ingredients and amounts used in the tested adhesives are listed in the following Table 2 along with the test results. All amounts listed are in weight percent.

TABLE 2

| | Comp Ex. 1 | Ex. 1 |
|---|---|---|
| Composition | | |
| Prepolymer 1 | 58.25 | 57.25 |
| Prepolymer 2 | 1.2 | 1.2 |
| Voranate M600 | 0.6 | 0.6 |

TABLE 2-continued

|  | Comp Ex. 1 | Ex. 1 |
|---|---|---|
| Desmodur N3300 | 0.8 | 0.8 |
| Printex 30 | 21 | 21 |
| Carbital 120 | 14 | 14 |
| Aerosil 208 | 0.8 | 0.8 |
| DEM | 0.05 | 0.05 |
| Vestinol 9 DINP | 0.8 | 0.8 |
| Silquest A 189 | 0.99 | 0.99 |
| Dynasilan 1170 | 0.11 | 0.11 |
| PAG-15 |  | 1 |
| DMDEE | 0.4 | 0.4 |
| UL 28 (2.4%) + vestinol | 1 | 1 |
| Total | 100.00 | 100.00 |
| Peel Strength |  |  |
| 7 D RT | 100% CF | 100% CF |
| 7 D 90° C. | 100% CF | 100% CF |
| 7 D Climate Change Cycle | 100% CF | 100% CF |
| 14 D Cataplasma | 100% AF | 100% CF |

The data from Table 2 show that the polyurethane adhesive compositions within the scope of the present invention resulted in significantly improved glass adhesion duration after being subjected to the 14-day cataplasm conditioning when using the monofunctional polyalkylene glycol in combination with calcium carbonate and the silane adhesion promoters.

What is claimed is:

1. A polyurethane adhesive composition comprising:
   (a) one or more urethane prepolymers having isocyanate moieties;
   (b) a catalytic amount of one or more catalysts;
   (c) one or more fillers;
   (d) one or more silane adhesion promoters; and
   (e) one or more monofunctional polyalkylene glycols.

2. The polyurethane adhesive composition according to claim 1, wherein the one or more urethane prepolymers are derived from a polyol containing alkylene oxide units of ethylene oxide, propylene oxide or mixtures thereof.

3. The polyurethane adhesive composition according to claim 1, wherein the one or more urethane prepolymers are derived from an aromatic isocyanate compound.

4. The polyurethane adhesive composition according to claim 1, wherein the one or more catalysts are selected from compounds containing one or more tertiary amine groups.

5. The polyurethane adhesive composition according to claim 4, wherein the one or more catalysts are selected from dimorpholino dialkyl ethers.

6. The polyurethane adhesive composition according to claim 1, wherein the one or more fillers are one or more forms of carbon black and one or more calcium carbonates.

7. The polyurethane adhesive composition according to claim 1, wherein the polyurethane adhesive composition does not contain clay.

8. The polyurethane adhesive composition according to claim 1, wherein the one or more silane adhesion promoters are selected from alkoxysilanes.

9. The polyurethane adhesive composition according to claim 1, wherein the one or more polyalkylene glycols are a $C_1$ to $C_{12}$ monofunctional alcohol initiated polyalkylene oxide chain wherein the polyalkylene oxide chain comprises units of ethyleneoxy propyloxy, butyleneoxy or a mixture thereof.

10. The polyurethane adhesive composition according to claim 1, wherein the one or more polyalkylene glycols have a number average molecular weight of 200 to 2,000.

11. The polyurethane adhesive composition according to claim 1, comprising:
   (a) 20 to 85 wt. % of the one or more urethane prepolymers having isocyanate moieties, based on the weight of the polyurethane adhesive composition;
   (b) 0.3 to 3.5 wt. % of the one or more catalysts, based on the weight of the polyurethane adhesive composition;
   (c) 15 to 50 wt. % of the one or more fillers, based on the weight of the polyurethane adhesive composition;
   (d) 0.1 to 5 wt. % of the one or more silane adhesion promoters, based on the weight of the polyurethane adhesive composition; and
   (e) 0.1 to 5 wt. % of the one or more polyalkylene glycols, based on the weight of the polyurethane adhesive composition.

12. The polyurethane adhesive composition according to claim 8, comprising:
   (a) 30 to 65 wt. % of the one or more urethane prepolymers having isocyanate moieties, based on the weight of the polyurethane adhesive composition;
   (b) 0.1 to 2.6 wt. % of the one or more catalysts, based on the weight of the polyurethane adhesive composition;
   (c) 15 to 23 wt. % of the one or more forms of carbon black, based on the weight of the polyurethane adhesive composition;
   (d) 8 to 20 wt. % of the one or more calcium carbonates and 0.7 to 3 wt. % of the one or more silane adhesion promoters, based on the weight of the polyurethane adhesive composition; and
   (e) 0.4 to 2 wt. % of the one or more polyalkylene glycols, based on the weight of the polyurethane adhesive composition.

13. A method comprising
   (a) applying a polyurethane adhesive composition to at least a portion of a first substrate, wherein the polyurethane adhesive composition comprises:
      (i) one or more urethane prepolymers having isocyanate moieties;
      (ii) a catalytic amount of one or more catalysts;
      (iii) one or more fillers;
      (iv) one or more silane adhesion promoters; and
      (v) one or more monofunctional polyalkylene glycols,
   (b) contacting a second substrate with the first substrate; and
   (c) curing the polyurethane adhesive composition to form an adhesive bond between the first substrate and the second substrate.

14. The method according to claim 13, wherein the first substrate is glass or coated plastic.

* * * * *